United States Patent [19]

St. Clair

[11] Patent Number: 5,499,409
[45] Date of Patent: Mar. 19, 1996

[54] EPOXIDIZED POLYDIENE BLOCK POLYMER WITH EPOXY RESINS

[75] Inventor: David J. St. Clair, Houston, Tex.

[73] Assignee: Shell Oil Company, Houston, Tex.

[21] Appl. No.: 277,379

[22] Filed: Jul. 18, 1994

[51] Int. Cl.⁶ .......................... C08L 53/00; C08L 53/02
[52] U.S. Cl. ....................................... 525/92 H; 525/529
[58] Field of Search ................................. 525/92

[56] References Cited

U.S. PATENT DOCUMENTS

| | | | |
|---|---|---|---|
| 4,237,245 | 12/1980 | Halasa et al. | 525/272 |
| 5,115,019 | 5/1992 | Marx et al. | 525/65 |
| 5,149,895 | 9/1992 | Coolbaugh et al. | 526/173 |
| 5,169,910 | 12/1992 | Corley | 525/481 |
| 5,191,024 | 3/1993 | Shibata et al. | 525/314 |
| 5,210,359 | 5/1993 | Coolbaugh et al. | 526/173 |
| 5,229,464 | 7/1993 | Erickson et al. | 525/314 |
| 5,247,026 | 8/1993 | Erickson et al. | 525/331.9 |

FOREIGN PATENT DOCUMENTS

| | | |
|---|---|---|
| 0396780A1 | 11/1989 | European Pat. Off. . |
| 0441485A2 | 1/1991 | European Pat. Off. . |

OTHER PUBLICATIONS

"Vinyl Ethers: Versatile Monomers for Coatings Applications," W. J. Burlant, J. S. Plotkin, F. J. Vara, International Specialty Products, RadTech Asia '91, Osaka, Japan, Apr. 1991.
"Cycloalipathic Epoxides–Cationic UV Cure," Union Carbide Chemicals and Plastics Company Inc., Apr. 1992.

Primary Examiner—Robert E. Sellers
Attorney, Agent, or Firm—Donald F. Haas

[57] ABSTRACT

The present invention provides a toughened cycloaliphatic epoxy resin composition useful as a coating comprising:

(a) a curable cycloaliphatic epoxy resin, (b) an epoxidized low viscosity polydiene polymer wherein the polymer contains from 2.0 to 6.0 milliequivalents of epoxy per gram of polymer, (c) a curing agent, (d) an aromatic epoxy resin, and (e) a hydroxy functional material.

11 Claims, No Drawings

EPOXIDIZED POLYDIENE BLOCK POLYMER WITH EPOXY RESINS

BACKGROUND OF THE INVENTION

This invention relates to blends of cycloaliphatic epoxy resins and epoxidized low viscosity polydiene polymers which are used for structural adhesives, coatings, electrical castings, encapsulants, potting compounds, laminates, and construction adhesives. More specifically, the invention relates to the use of epoxidized low viscosity polydiene polymers as toughening modifiers for cycloaliphatic epoxy resins.

Cycloaliphatic epoxy resins are generally known to be useful in a wide range of products such as filament-wound composites, as encapsulants for electrical products and in adhesives and coatings. Such resins include the Union Carbide Cycloaliphatic Epoxides and CYRACURE® resins. Cycloaliphatic epoxy resins have the disadvantage that they are very brittle when cured. This brittleness makes them unsuitable for many applications including in coatings where brittleness leads to poor adhesion, in structural adhesives where brittleness causes poor impact resistance and in electrical encapsulants where brittleness leads to poor thermal shock resistance. In a recent development, it was found that by blending the cycloaliphatic epoxy resins with specified low viscosity epoxidized polydienes a degree of flexibility could be imparted to these cycloaliphatic epoxy resins while retaining most, if not all, of their advantageous characteristics. These compositions are useful in many applications. However, because their flexibility and ability to adhere to substrates such as metals are lower than desired, they are not as suitable for use as impact resistant adhesives and coatings. The present invention provides an improved composition which is more flexible and adheres better to metals.

SUMMARY OF THE INVENTION

This invention is an improvement on the composition described in a copending, commonly assigned U.S. patent application Ser. No. 228,250, filed Apr. 15, 1994, now pending entitled "Epoxidized Low Viscosity Rubber Toughening Modifiers for Cycloaliphatic Epoxy Resins," which is herein incorporated by reference, a toughened cycloaliphatic epoxy resin composition containing an epoxidized low viscosity polydiene polymer blended with the cycloaliphatic epoxy resin. The improved composition contains, in addition, an aromatic epoxy resin, preferably a glycidyl ether-type, and a hydroxy functional material which is compatible with the cycloaliphatic epoxy resin modified with the epoxidized polymer.

Suitable aromatic epoxy resins include glycidyl ethers prepared by the reaction of epichlorohydrin with an aromatic compound containing at least one hydroxyl group, typically the reaction of epichlorohydrin with mono, di, and trihydroxy phenolic compounds. The hydroxy functional material is generally a relatively low molecular weight compound having at least 6 carbon atoms and at least one hydroxyl group which is soluble in the blend of the epoxy resin with the epoxidized polydiene polymer.

These low viscosity polymers are epoxidized copolymers of at least two conjugated dienes, preferably isoprene and butadiene. Preferred polymers for use in this invention are described in copending, commonly assigned, U.S. patent application Ser. No. 228,047, filed Apr. 15, 1994, now pending, entitled "Epoxidized Low Viscosity Rubber," which is herein incorporated by reference. The copolymers may also contain up to 50% by weight, preferably 40%, of at least one vinyl aromatic hydrocarbon, preferably styrene. The monomers can be block or randomly copolymerized. The copolymers can be in the linear, radial, or star configuration.

DETAILED DESCRIPTION OF THE INVENTION

The invention composition is a composition which includes a cycloaliphatic epoxy resin. The cycloaliphatic epoxy resin component of the composition can be any curable cycloaliphatic resin having, on the average, more than one epoxide group per molecule and may bear substituents which do not materially interfere with the curing reaction. It will generally comprise from 30 to 90 percent by weight of the total composition.

Suitable cycloaliphatic epoxy resins include those made by oxidation of cyclic polyolefins with a peracid, typically peracetic acid. The major suppliers of suitable cycloaliphatic epoxy resins are Union Carbide and Ciba Geigy. The resins are marketed by Union Carbide as Cycloaliphatic Epoxides and, more recently, under the trade name CYRACURE. Typical structures for these resins are given in Union Carbide brochures "Cycloaliphatic Epoxide Systems", 9/87, and "CYRACURE Cycloaliphatic Epoxides, Cationic UV Cure", 4/92. A particularly preferred cycloaliphatic epoxy resin is Union Carbide's ERL-4221, also sold as CYRACURE UVR-6110 (3,4-epoxycyclohexylmethyl-3,4-epoxycyclohexane carboxylate). This is also the most widely used cycloaliphatic epoxy resin in the industry today. The epoxidized polydiene polymers of this invention have particularly good compatibility with CYRACURE UVR-6110, making them particularly good tougheners for this resin.

Other cycloaliphatic epoxy resins include those having glycidyl ether epoxide groups. Glycidyl ether epoxy resins are typically made by reaction of a diol or polyol with epichlorohydrin. A particularly preferred glycidyl ether epoxy resin is EPONEX 1510 from Shell Chemical, made by reaction of hydrogenated bis-phenol A with epichlorohydrin. Other examples of aliphatic glycidyl ether epoxy resins are those made by reaction of epichlorohydrin with low molecular weight alcohols such as 1,4-butane diol, 1,6-hexane diol and the like.

Aromatic epoxy resins are used to replace a portion of the cycloaliphatic epoxy resin in order to reduce cost and improve adhesion. These resins do not have cycloaliphatic groups. The content of aromatic epoxy resins in the formulation is generally limited because they degrade the resistance of the composition to degradation by light so they may only form a minor portion of the total amount of epoxy resin. The aromatic epoxy resin is generally used in an amount from 3 to 30 percent by weight (%w) of the total composition. Aromatic epoxy resins suitable for the invention compositions have number average molecular weights generally within the range of 86 to about 10,000, preferably about 200 to about 1500. Preferred aromatic epoxy resins have the following structure where n= 0 to 15:

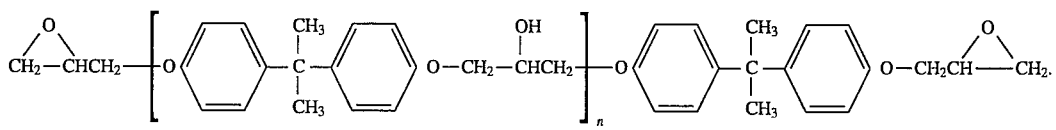

The commercially-available epoxy resin EPON® Resin 828, a reaction product of epichlorohydrin and 2,2-bis(4-hydroxyphenylpropane) Coisphenol-A) having a molecular weight of about 400, an epoxide equivalent weight (ASTM D-1652) of about 185–192, and an n value (from the formula above) of about 0.13, is the preferred epoxy resin because of its low cost, low viscosity, mechanical performance, and commercial availability. Other examples of aromatic epoxy resins are liquid resins such as EPON® 825, a reaction product of epichlorohydrin and bisphenol-A with an n value of about 0.04, EPON® 826, a reaction product of epichlorohydrin and bisphenol-A with an n value of about 0.08, and solid resins such as EPON® 1001, a reaction product of epichlorohydrin and bisphenol-A with an n value of about 2.3, EPON® 1002, a reaction product of epichlorohydrin and bisphenol-A with an n value of about 3.4, EPON® 1031, a reaction product of epichlorohydrin and tetraphenylol ethane with an epoxide equivalent weight of about 220, and the like.

The hydroxy functional material is a relatively low molecular weight, 75 to 300, preferably 100 to 150, number average molecular weight, mono, di, tri, or tetra (although there may be more hydroxy groups) hydroxy functional compound which contains at least 6 carbon atoms and which is soluble in the cycloaliphatic epoxy resin/epoxidized polydiene blend. It should be present in an amount from 1 to 30 percent by weight of the total composition because less than 1% w is too little to improve adhesion and more than 30 % w will reduce the cure rate of the composition. Suitable hydroxy functional materials include straight chain or branched mono-ols, diols, triols, and polyols such as 1,6 hexane diol, cycloaliphatic mono-ols, diols, triols, and polyols such as cyclohexane dimethanol, and aromatic mono-ols, diols, triols and polyols such as bisphenol A. A particularly preferred hydroxy compound is 2-ethyl-1,3-hexane diol because it is a liquid and because of its high degree of compatibility with the blend of cycloaliphatic epoxy resins and the epoxidized polymers, its low viscosity, and its low volatility.

Preferred epoxidized low viscosity polymers of the present invention have the general formula

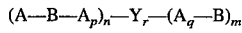

wherein Y is a coupling agent or coupling monomers or initiator, and wherein A and B are polymer blocks which may be homopolymer blocks of conjugated diolefin monomers, copolymer blocks of conjugated diolefin monomers, or copolymer blocks of diolefin monomers and monoalkenyl aromatic hydrocarbon monomers. The epoxidized polymers are used in an amount from 5 to 40% w of the total composition because this is the range over which they will toughen the cured composition without undue softening of the cured composition. Polymers of this type are described in more detail in U.S. Pat. No. 5,229,464 and in copending application Ser. No. 228,250, now pending which are herein incorporated by reference. Generally, it is preferred that the A blocks should have a greater concentration of more highly substituted aliphatic double bonds than the B blocks have. Thus, the A blocks have a greater concentration of di-, tri-, and tetra-substituted unsaturation sites (aliphatic double bonds) per unit of block mass than do the B blocks. This produces a polymer wherein most of the epoxy functionality is localized in the exterior blocks—the A blocks (1,1-disubstituted, 1,2-disubstituted, 1,1,2-trisubstituted and 1,1,2,2-tetrasubstituted olefinic epoxides). In the above formula, the arms can also be B-A-B and B-A. The A blocks have a molecular weight of from 100 to 6,000, preferably 100 to 3000, most preferably 1000 to 2000, and the B blocks have a molecular weight of from 1000 to 15,000, preferably 2000 to 10000, most preferably 3000 to 7000. n is greater than 0, r is 0 or 1, m is greater than or equal to 0, and n+m ranges from 1 to 100. p and q may be 0 or 1. The epoxidized polymers have an epoxy content of from 2.0 to 6.0 milliequivalents of epoxy per gram of polymer (meq/g), preferably 3.5 to 5.0. For broadest utility, the polymers must contain some unsaturation. However, in certain suitably formulated compositions to be described below, hydrogenated polymers can be used. The low viscosity epoxidized polymers have an overall molecular weight (peak, as determined by GPC) generally ranging from 1000 to 300,000, preferably 1000 to 100,000, and most preferably from 1000 to 20,000, and are preferably liquids.

Useful randomly epoxidized star polymers are described in U.S. Pat. No. 5,247,026 which is herein incorporated by reference. That patent describes randomly epoxidized star polymers, based on at least one conjugated diolefin monomer, that contain di-, tri- and/or tetrasubstituted olefinic epoxides. The star polymers have greater than four arms or branches. Each arm has a molecular weight from 1500 to 15,000 and contains the concentration of di-, tri-, or tetra-substituted olefinic epoxides (1,1-disubstituted, 1,2-disubstituted, 1,1,2-trisubstituted and 1,1,2,2-tetrasubstituted olefinic epoxides) described below.

Polyisoprene homopolymers which have been epoxidized to the required extent may also be useful in toughening cycloaliphatic epoxy resins. Such polymers must be low viscosity and low molecular weight- the molecular weight should be in the range from about 500 to about 20,000. These polymers, as all of the polymers described herein, may contain some amount of a vinyl aromatic hydrocarbon, preferably styrene, as described below.

When the concentration of alkenyl aromatic in the epoxidized polymer is less than or equal to 5% by weight, the concentration of epoxide may range from 3 to 6 meq/g of polymer. When the A block is a block composed primarily of randomly copolymerized isoprene and styrene and the concentration of alkenyl aromatic hydrocarbon monomer is from about 5% to 20% by weight, the concentration of epoxide may range from 2 to 6 meq/g of polymer. When the B block is a block composed primarily of randomly epoxidized butadiene and styrene and the concentration of monoalkenyl aromatic hydrocarbon is from about 5% to 50% by weight, the concentration of epoxide may again range from 2 to 6 meq/g of polymer. These polymer compositions are for non-hydrogenated, unsaturated polymers. Hydrogenation of these polymers tends to reduce the compatibility of the epoxidized polymers with cycloaliphatic resins. However, in certain suitably formulated compositions, hydrogenated polymers can be used.

It has been found that by the proper combination of unsaturation, epoxide level, and alkenyl aromatic monomer content, a low viscosity polydiene which possesses suitable compatibility with cycloaliphatic epoxy resins to yield an improved balance of properties can be made. The presence of epoxidation and unsaturation is required in the low viscosity polymers to achieve the broadest compatibility of the polymers with cycloaliphatic resins. Therefore, in most cases, the majority of the diene mers remain unsaturated before epoxidation in the preferred polymers. When alkenyl aromatic monomers are present at concentrations of less than 5% by weight, the preferred epoxide level ranges from 3 to 6 meq/g of polymer. When alkenyl aromatic monomers are incorporated at levels of 5% by weight or greater in the largely unsaturated polydiene block copolymer, its compatibility with cycloaliphatic epoxy resin is improved to such a degree that lower levels of epoxidation will yield improved rubber modified cycloaliphatic epoxy resins. Thus, when alkenyl aromatic monomers are present at concentrations of 5% by weight or greater, the preferred epoxide level ranges from 2 to 6 meq/g of polymer.

The preferred epoxy concentration for all of these polymers is from 3.5 to 5.0 meq/g. If the epoxy concentration is less than about 3.5, compatible blends of the polymer with the resin are more difficult to obtain. If the epoxy concentration is greater than about 5.0, the performance benefit obtained is not justified by the increased cost of the polymer. The goal is to achieve a composition which is on the edge of compatibility and incompatibility and each cycloaliphatic epoxy resin formulation may have its own particular epoxidized polydiene polymer that works best in this regard. The epoxy level, degree of unsaturation, and styrene content of the preferred polymers of this invention are specified herein to achieve such a degree of compatibility with cycloaliphatic epoxy resins.

It has been found that hydrogenated versions of these epoxidized polymers, even those which are only partially hydrogenated, are highly incompatible with cycloaliphatic epoxy resins. These polymers can be used to produce excellent toughened cycloaliphatic epoxy resin compositions if a vinyl ether compound is also incorporated into the composition at a level of at least 20 percent by weight. It is preferred that no more than about 80 percent by weight of the vinyl ether be added to the composition because the curing agents such as the cationic photoinitiator, UVR-6974, become insoluble in the formulation. Vinyl ethers are particularly well suited for use in combination with cycloaliphatic epoxy resins because vinyl ethers can also be cured via a cationic cure mechanism which is frequently used to cure cycloaliphatic epoxy resin compositions. In compatibility screening studies of the commercially available vinyl ethers, one vinyl ether stood out as having particularly good compatibility with the epoxidized hydrogenated polymers. This vinyl ether was RAPI-CURE CHVE, cyclohexane dimethanol divinyl ether, from ISP, Inc.

In another embodiment of this invention, a blend of an epoxidized polydiene polymer used as a toughness modifier and a low molecular weight epoxy functional diluent used as a viscosity reducer is employed as a modifier for cycloaliphatic epoxy resins. These diluents include epoxidized oils, such as epoxidized soybean oil and epoxidized castor oil, naturally occurring epoxidized oils, such as vernonia oil, epoxidized olefins, such as vinyl cyclohexene monoxide, and glycidyl ether epoxides such as butyl glycidyl ether, phenyl glycidyl ether and the like. The appropriate ratio of epoxidized polydiene polymer to epoxidized diluent must be determined for each particular application. However, typically, the weight ratio of epoxidized polymer to epoxidized diluent should range from 100/1 to about 1/1.

The epoxidized rubber modified cycloaliphatic epoxy resins can be cured by a variety of means. Anhydride curing agents are commonly used. Such .anhydride curing agents may be generally described as any compound containing one or more anhydride functional groups. Most commonly used anhydrides have an aromatic, cycloaliphatic or aliphatic structure. The curing agent may be selected from the group consisting of phthalic anhydride, substituted phthalic anhydrides, hydrophthalic anhydrides, substituted hydrophthalic anhydrides, succinic anhydride, substituted succinic anhydrides, halogenated anhydrides, multifunctional carboxylic acids, and polycarboxylic acids. Examples include phthalic anhydride, tetrahydrophthalic anhydride, nadic methyl anhydride, hexahydrophthalic anhydride, pyromellitic dianhydride, methyltetrahydrophthalic anhydride, and dodecenylsuccinic anhydride, and the like. In addition, multifunctional carboxylic acids will provide similar performance. The anhydride is combined with the modified cycloaliphatic epoxy resins such that a suitable anhydride/epoxide molar ratio is achieved. This ratio should range from 0.8/1 to 1.2/1 to achieve suitably complete cycloaliphatic epoxy network formation. Usually, the best properties are found at the highest crosslink density, which occurs at 1/1 anhydride/epoxy molar ratio. Typically, the anhydride cures are conducted at elevated temperatures, 100° to 170° C. for a period of 30 minutes to 6 hours, and are often referred to as "bake cures." The anhydride bake cures can be accelerated by using a curing accelerator. Suitable curing accelerators include trialkyl amines, hydroxyl-containing compounds and imidazoles. Benzyldimethylamine and ethylmethylimidazole have been found to work well in curing the blends of the present invention.

Another common method to cure cycloaliphatic epoxide groups is via a catalytic, ring-opening, homopolymerization to generate ether linkages between molecules. Typical catalysts are Lewis acids, such as boron trifluoride, and protic acids, including phosphoric acid and sulfonic acids such as trifluoromethanesulfonic acid. These acids will cure cycloaliphatic epoxy resins very quickly at ambient temperatures. Therefore, the resin and catalyst must be used as a two-component product in which the two components are mixed immediately before application and must be applied before the mixture gels. These acids are also available in the salt form using volatile bases to block the epoxy curing reaction. These blocked catalysts can be mixed with the epoxy resin, since no reaction occurs at ambient temperatures, giving a one-component product. After application, the formulation is baked, releasing the blocking agent to regenerate the acid which initiates cure of the epoxide groups. Another type of blocked catalytic curing agent, which is commercially available from Union Carbide as CYRACURE UVI-6974, is an aryl sulfonium salt which, when exposed to ultraviolet radiation, generates a cation which can initiate cure of the epoxide groups. This cationic photoinitiator can be blended with the cycloaliphatic epoxy resin in a one-component product which, after application, can be exposed to UV radiation to initiate cure.

The blends of the present invention may be used in any of the applications in which cycloaliphatic epoxy resins are presently used. Typical applications are structural adhesives, coatings, composites and electrical encapsulants. The compositions of the present invention are useful in adhesives (including contact adhesives, laminating adhesives, assembly adhesives, and structural adhesives), in sealants, potting compounds, coatings such as topcoats for automotive, inks (as replacements for resins such as rosin, hydrocarbon and alkyds, as modifiers for cationic curing U.V. screen inks, litho and flexo inks), and molded thermoset parts. The blends of the present invention should be more flexible, have higher toughness and have better thermal shock resistance when used in a structural adhesive, coating, composite or encapsulant than products using cycloaliphatic epoxy resins alone.

A wide variety of fillers can be used in formulations within the present invention. Suitable fillers include calcium carbonate, clays, talcs, zinc oxide, titanium dioxide, silica and the like. The amount of filler usually is in the range of 0 to about 65% by weight of the formulation depending on the type of filler used and the application for which the formulation is intended. Preferred fillers are silica and titanium dioxide.

Stabilizers known in the art may also be incorporated into the composition. These may be for protection during the life of the article against, for example, oxygen, ozone and ultra-violet radiation. These may also be for stabilization against thermo-oxidative degradation during elevated temperature processing. Antioxidants which interfere with the curing reaction should be avoided.

Molecular weights of linear polymers or unassembled linear segments of polymers such as mono, di, triblock polymers, arms of star polymers before coupling, etc. are conveniently measured by Gel Permeation Chromatography (GPC), where the GPC system has been appropriately calibrated. For polymers of the type described herein, the appropriate standard is a narrow molecular weight distribution polystyrene standard. For anionically polymerized linear polymers, the polymer is essentially monodisperse and it is both convenient and adequately descriptive to report the "peak" molecular weight of the narrow molecular weight distribution observed. The peak molecular weight is usually the molecular weight of the main species shown on the chromatograph. For materials to be used in the columns of the GPC, styrene-divinyl benzene gels or silica gels are commonly used and are excellent materials. Tetrahydrofuran is an excellent solvent for polymers of the type described herein. Ultraviolet or refractive index detectors may be used.

Measurement of the true molecular weight of a coupled star polymer is not as straightforward or as easy to make using GPC. This is because the star shaped molecules do not separate and elute through the packed GPC columns in the same manner as do the linear polymers used for the calibration. Hence, the time of arrival at an ultraviolet or refractive index detector is not a good indicator of the molecular weight. A good method to use for a star polymer is to measure the weight average molecular weight by light scattering techniques. The sample is dissolved in a suitable solvent at a concentration less than 1.0 gram of sample per 100 milliliters of solvent and filtered using a syringe and porous membrane filters of less than 0.5 microns pore size directly into the light scattering cell. The light scattering measurements are performed as a function of scattering angle, polymer concentration and polymer size using standard procedures. The differential refractive index (DRI) of the sample is measured at the same wavelength and in the same solvent used for the light scattering. The following references are herein incorporated by reference:

1. *Modern Size-Exclusion Liquid Chromatography*, M. W. Yau, J. J. Kirkland, D. D. Bly, John Wiley and Sons, New York, New York, 1979.
2. *Light Scattering From Polymer Solutions*, M. B. Huglin, ed., Academic Press, New York, New York, 1972.
3. W. K. Kai and A. J. Havlik, *Applied Optics*, 12, 541 (1973).
4. M. L. McConnell, *American Laboratory*, 63, May, 1978.

If desired, these block copolymers can be partially hydrogenated. Hydrogenation may be effected selectively as disclosed in U.S. Pat. Reissue No. 27,145 which is herein incorporated by reference. The hydrogenation of these polymers and copolymers may be carried out by a variety of well established processes including hydrogenation in the presence of such catalysts as Raney Nickel, nobel metals such as platinum and the like, soluble transition metal catalysts and titanium catalysts as in U.S. Pat. No. 5,039,755 which is also incorporated by reference. The polymers may have different diene blocks and these diene blocks may be selectively hydrogenated as described in U.S. Pat. No. 5,229,464 which is also herein incorporated by reference.

The toughened cycloaliphatic epoxy resin compositions of this invention may be used in a variety of applications. They have special utility in structural adhesives and coatings where they may be combined with anhydride curing agents or catalytic curing agents to form excellent, impact resistant products. They have special utility in coatings, where they may be combined with a cationic photoinitiator and, after application to a substrate, can be cured by exposure to UV radiation to form excellent, flexible products. Other applications for these compositions include electrical castings, encapsulants, potting compounds, laminates, and construction adhesives.

EXAMPLES

One important application of these epoxidized-rubber modified cycloaliphatic epoxy resin compositions is in coatings, especially coatings crosslinked via a UV initiated cationic cure reaction. The formulations used for the following experiments are shown in the table. The cycloaliphatic epoxy resin was CYRACURE UVR-6110, 3,4-epoxycyclohexyl-methyl- 3,4-epoxycyclohexane carboxylate, from Union Carbide. The epoxidized rubber was a diblock copolymer of isoprene and butadiene having block molecular weights of 820 and 4700, respectively, and was epoxidized to a level of 4.5 meq of epoxy per gram of polymer. The cationic photoinitiator was CYRACURE UVI-6974, mixed triarylsulfonium hexafluoroantimonate salts, from Union Carbide. A wetting agent, FLUORAD FC-430, a nonionic fluorochemical surfactant from 3M, was used to reduce the surface tension of the coating and improve its ability to wet the aluminum substrate onto which the compositions were coated. The aromatic epoxy resin was EPON® 828 resin. The hydroxy functional material was PEP-DIOL, 2-ethyl-1,3-hexane diol purchased from Aldrich.

The films were evaluated for mechanical properties. The appearance of the coatings was judged visually. The pencil hardness (gouge) of the coatings was measured according to the ASTM D3363 method of pushing successively softer pencil leads across the coating until the pencil lead will no longer gouge through the coating. The hardness scale (softest to hardest) is 6B<5B<4B<3B<2B<B<HB<F<H<2H<3H<4H<5H<6H The methyl ethyl ketone (MEK) resistance of the coatings was measured according to the ASTM D4752 method of rubbing an MEK-moistened cloth across the coating for 200 cycles, or until breakthrough to the aluminum substrate occurred (one cycle equals one forward and one backward stroke). Since all the coatings survived 200 cycles without breakthrough, they were given a letter rating describing the appearance of the area rubbed with MEK for 200 cycles. A means no change, B means slight loss of gloss, and C means significant loss of gloss. Adhesion of the coatings was measured with the cross hatch adhesion test, ASTM D3359, Method B. In this test, a lattice pattern is scribed through the coating, pressure sensitive tape is applied and removed, and the amount of coating removed with the tape is rated. The scale ranges from 5 (no adhesion loss) to 0 (greater than 65% adhesion loss). The flexibility of the coatings was measured with the mandrel bend test according to ASTM D522, Method A. In this test, the coated 4-inch wide, 25 mil thick panel is bent around a standard conical mandrel and the percentage of the distance across the panel through which the coating cracks is measured (0% is no cracking, 100% is cracking of the coating completely across the panel).

Example 1

The formulations used in this work are given in the table. A masterbatch of the photoinitiator, CYRACURE UVI-6974, and fluorocarbon surfactant, FLUORAD FC-430 (3M), was prepared in UVR-6110 for use in the blends. All blends were mixed manually at about 100° C. They were cooled to about 60° C. and coated onto aluminum substrates (A412 Q-panels) with a #22 wire rod. The coated panels were irradiated at 10 feet per minute with 1 medium pressure mercury lamp and post baked 10 minutes at 121° C. The viscosities of the mixtures were measured at 25° C. using a Bohlin VOR Rheometer with concentric cylinder C14. Viscosity valves in the table are at 36 $sec^{-1}$ shear rate.

The viscosities of the blends and properties of the cured coatings are given in the table. Qualitative inspection showed all 12 of the coatings were hard, clear, mar resistant coatings having high gloss and excellent surface appearance. Formulations 1, 2, and 3 show the effect of the epoxidized polymer on coatings based on UVR-6110. The results of the MEK rub test show all three coatings are well cured. However, all three have poor adhesion and fail the mandrel bend test. Formulations 4, 5, and 6 also show the effect of the epoxidized polymer on coatings containing 10 percent weight EPON® RESIN 828. Again, all three coatings are well cured but all have poor adhesion and fail the mandrel bend test.

Formulations 7 through 12 are the same as formulations 1 through 6 except they also contain 10 percent weight of the small diol, 2-ethyl-1,3-hexane diol (PEP-DIOL). In 4 of the 6 formulations, addition of 10 percent weight PEP-DIOL improved adhesion. This confirms literature data showing that addition of hydroxyl functional molecules in cycloaliphatic epoxy resin coatings is effective in improving performance. Union Carbide literature recommends an R value (R=#epoxides/#hydroxyls) between 1.5 and 10. The R value in this work is about 4.5. PEP-DIOL was selected for use in these coatings because of its better compatibility with the blend of epoxy resins and the epoxidized polymers than the less substituted small diols like ethylene glycol and 1,4-butane diol.

Formulations 7 through 12 allow assessment of the effectiveness of the epoxidized polymer as a toughener. Formulations 7 and 10 have good adhesion but fail the mandrel bend test. Addition of 10 or 20 percent weight epoxidized polymer to these formulations generally seems to reduce crosshatch adhesion. However, the epoxidized polymer toughens the coatings so they will pass the mandrel bend test. In fact, formulation 12, toughened with 20 percent weight epoxidized polymer, gives excellent performance in all of the test categories used in this work.

TABLE

| Composition, pbw | 1 | 2 | 3 | 4 | 5 | 6 | 7 | 8 | 9 | 10 | 11 | 12 |
|---|---|---|---|---|---|---|---|---|---|---|---|---|
| CYRACURE UVR-6110 | 100 | 90 | 80 | 90 | 80 | 70 | 90 | 80 | 70 | 80 | 70 | 60 |
| EPON RESIN 828 | | | | 10 | 10 | 10 | | | | 10 | 10 | 10 |
| EPOXIDIZED POLYMER | | 10 | 20 | | 10 | 20 | | 10 | 20 | | 10 | 20 |
| PEP-DIOL | | | | | | | 10 | 10 | 10 | 10 | 10 | 10 |
| CYRACURE UVI-6974 | 0.5 | 0.5 | 0.5 | 0.5 | 0.5 | 0.5 | 0.5 | 0.5 | 0.5 | 0.5 | 0.5 | 0.5 |
| FLUORAD FC-430 | 0.1 | 0.1 | 0.1 | 0.1 | 0.1 | 0.1 | 0.1 | 0.1 | 0.1 | 0.1 | 0.1 | 0.1 |
| Viscosity @ 25 C, cps | 400 | 740 | 1440 | 500 | 1020 | 1790 | 230 | 460 | 880 | 280 | 530 | 1090 |
| Properties | | | | | | | | | | | | |
| Thickness, mil | 1.1 | 0.8 | 1.1 | 1.1 | 1.4 | 1.2 | 1.4 | 1.3 | 1.3 | 1.3 | 1.3 | 1.2 |
| Pencil Hardness | F | HB | H | H | H | H | H | H | H | H | H | H |
| @ 200 MEK Rubs | A | A | A | A | B | B | B | A | A | C | C | A |
| Crosshatch Adhesion | 0 | 0 | 0 | 0 | 0 | 0 | 4 | 1 | 0 | 3 | 0 | 5 |
| Mandrel Bend | Fail | Fail | Fail | Fail | Fail | Fail | Fail | Pass | Pass | Fail | Pass | Pass |

We claim:

1. A toughened cycloaliphatic epoxy resin composition comprising:
   (a) 30 to 90 percent by weight of a curable cycloaliphatic epoxy resin,
   (b) 5 to 40 percent by weight of an epoxidized low viscosity polydiene polymer which contains less than 5% by weight of a vinyl aromatic hydrocarbon wherein the polymer contains from 3.0 to 6.0 milliequivalents of epoxy per gram of polymer, said polymer having the structural formula $(A—B—A_p)_n—Y_r—(A_q—B)_m$ wherein Y is a coupling agent or coupling monomer or initiator, A and B are homopolymer blocks of conjugated diolefin monomers or copolymer blocks of conjugated diolefin monomer, the A blocks having a molecular weight of from 100 to 6,000 and the B blocks having a molecular weight of from 1000 to 15,000, n is greater than 0, r is 0 or 1, m is greater than or equal to ), n+ m ranges from 1 to 100, and p and q is 0 or 1
   (c) a curing agent,
   (d) 3 to 30 percent by weight of an aromatic epoxy resin, and
   (e) 1 to 30% by weight of a hydroxy functional material which has a number average molecular weight of 75 to 300, at least 6 carbon atoms, and is soluble in a blend of (a) and (b).

2. The composition of claim 1 wherein the conjugated diolefin in the A block is isoprene and the conjugated diolefin in the B block is butadiene.

3. The composition of claim 1 wherein the conjugated diolefin in the A block is 1,4-butadiene and the conjugated-diolefin in the B block is 1,2-butadiene.

4. The composition of claim 1 wherein the curing agent is selected from the group consisting of phthalic anhydride, substituted phthalic anhydrides, hydrophthalic anhydrides, substituted hydrophthalic anhydrides, succinic anhydride, substituted succinic anhydrides, and polycarboxylic acids.

5. The composition of claim 1 wherein the curing agent is a halogenated anhydride.

6. The composition of claim 1 wherein the curing agent is a catalytic curing agent selected from the group consisting of protic acids, Lewis acids and salt-blocked versions thereof.

7. A coating composition comprising the composition of claim 1.

8. A coating composition comprising the composition of claim 1.

9. The composition of claim 4 wherein an accelerator is added and the composition is cured.

10. A structural adhesive composition comprising the composition of claim 1.

11. The composition of claim 1 wherein the epoxidized polymer is at least partially hydrogenated and the composition also comprises at least 20% by weight of a vinyl ether.

* * * * *